United States Patent
Teraya (10) Patent No.: US 9,718,453 B2
(45) Date of Patent: Aug. 1, 2017

(54) HYBRID VEHICLE

(71) Applicant: Toyota Jidosha Kabushiki Kaisha, Toyota-shi Aichi-ken (JP)

(72) Inventor: Ryuta Teraya, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/575,152

(22) Filed: Dec. 18, 2014

(65) Prior Publication Data

US 2015/0191179 A1 Jul. 9, 2015

(30) Foreign Application Priority Data

Jan. 7, 2014 (JP) ................. 2014-001157

(51) Int. Cl.
*B60W 10/06* (2006.01)
*B60W 10/26* (2006.01)
(Continued)

(52) U.S. Cl.
CPC ............. *B60W 10/26* (2013.01); *B60H 1/034* (2013.01); *B60H 1/2218* (2013.01); *B60W 10/06* (2013.01); *B60W 10/08* (2013.01); *B60W 20/40* (2013.01); *B60H 2001/2237* (2013.01); *B60H 2001/2253* (2013.01); *B60H 2001/2265* (2013.01); *B60W 2510/0676* (2013.01); *B60W 2510/244* (2013.01); *B60W 2710/0677* (2013.01); *B60W 2710/0688* (2013.01); *Y02T 10/6286* (2013.01); *Y10S 903/93* (2013.01)

(58) Field of Classification Search
CPC ..... B60H 1/034; B60H 1/2218; B60W 10/06; B60W 10/08; B60W 10/26; B60W 20/40
See application file for complete search history.

(56) References Cited

U.S. PATENT DOCUMENTS

2007/0246554 A1 10/2007 Watanabe et al.
2008/0168766 A1 7/2008 Oomura
(Continued)

FOREIGN PATENT DOCUMENTS

CN 102470859 A 5/2012
JP H08244439 A 9/1996
(Continued)

*Primary Examiner* — Mussa A Shaawat
*Assistant Examiner* — Nadeem Odeh
(74) *Attorney, Agent, or Firm* — Dinsmore & Shohl LLP (57) ABSTRACT

A first heater heats a vehicle compartment by using cooling water of the internal combustion engine. A second heater heats the vehicle compartment by using electrical power supplied by the electrical storage device. The controller during driving of the internal combustion engine, when a temperature of the cooling water is equal to or higher than a reference temperature, controls the internal combustion engine to stop; when the second heater is operated during driving of the internal combustion engine, when a state quantity indicating a state of charge of the electrical storage device is equal to or higher than a threshold, controls the second heater such that an amount of heat generation of the second heater is higher than that generated when the state quantity is less than the threshold; and sets the reference temperature to be low as compared to when the state quantity is less than the threshold.

2 Claims, 4 Drawing Sheets

(51) Int. Cl.
*B60W 10/08* (2006.01)
*B60W 20/40* (2016.01)
*B60H 1/03* (2006.01)
*B60H 1/22* (2006.01)

(56) References Cited

U.S. PATENT DOCUMENTS

2009/0063009 A1 3/2009 Jinno
2010/0326127 A1 12/2010 Oomura et al.
2013/0020398 A1* 1/2013 Goto ................. B60H 1/00285
237/12.4
2014/0110489 A1 4/2014 Yasui

FOREIGN PATENT DOCUMENTS

| JP | 2005-319910 A | 11/2005 | |
| JP | 2008-174042 A | 7/2008 | |
| JP | 2008-180215 A | 8/2008 | |
| JP | 2010-255504 A | 11/2010 | |
| JP | 2011-005982 A | 1/2011 | |
| JP | WO 2011108067 A1 * | 9/2011 | ......... B60H 1/00285 |
| JP | 2012-076710 A | 4/2012 | |
| JP | 2013-151176 A | 8/2013 | |
| WO | 2012172660 A1 | 12/2012 | |

\* cited by examiner

HYBRID VEHICLE

INCORPORATION BY REFERENCE

The disclosure of Japanese Patent Application No. 2014-001157 filed on Jan. 7, 2014 includes a specification, drawings and an abstract are incorporated herein by reference in its entirety.

BACKGROUND OF THE INVENTION

1. Field of the Invention

The invention relates to a hybrid vehicle, and in particular, relates to a hybrid vehicle provided with an electric heater that heats a vehicle compartment by using electrical power supplied by an electrical storage device.

2. Description of Related Art

When an engine is cooled by cooling water, since heat is exchanged between the engine and the cooling water, the temperature of the cooling water rises. Therefore, generally, in an air-conditioner mounted in a hybrid vehicle and the like, air is heated by using the heated cooling water so as to supply heat to a vehicle compartment. To ensure the heating performance of the air-conditioner, the temperature of the cooling water is necessarily high enough. Thus, to raise the temperature of the cooling water, a request for driving the engine is generated.

In Japanese Patent Application Publication No. 2010-255504 (JP 2010-255504 A), an example of such a hybrid vehicle is disclosed. According to a controller of the hybrid vehicle disclosed by Japanese Patent Application Publication No. 2010-255504, even in a case where there is a request for driving the engine to ensure the heating performance, except when there is a request for driving the engine to warm up the engine or a request for driving the engine to output running power, driving of the engine is prohibited. Thereby, since the engine doesn't only drive for ensuring the heating performance, the fuel economy can be improved.

SUMMARY OF THE INVENTION

Since the opportunity of driving an engine is increased in a case where the heating to the compartment is performed, the consumption of fuel is increased. Particularly, in winter or in cold area, the consumption of the fuel is increased significantly. To reduce the consumption of the fuel, the engine may be controlled to intermittently stop (also be called as intermittent stop control hereafter). In the intermittent stop control, when the temperature of the cooling water does not rise to a reference temperature for ensuring the desired heating performance, stop of the engine is prohibited. When the temperature of the cooling water reaches the reference temperature, stop of the engine is permitted.

If the aim is to raise the temperature of the cooling water, the engine does not need to produce high power. Therefore, it is considered that it is only necessary to drive engine in an idle state. However, in the idle state, the efficiency of the engine (power output from the engine with prescribed fuel consumption) is low, thus it is not desired to drive the engine in the idle state only for ensuring the heating performance.

Accordingly, it is considered that the engine is operated, such that the engine produces power higher than that produced when the engine is in the idle state. In this case, although excessive power is produced from the viewpoint of ensuring the heating performance, the power may be utilized to enable a motor generator to generate electrical power. If the electrical power generated by the motor generator is used for charging a battery, the waste of the excessive power can be minimized, while the engine drives in a state with good efficiency.

However, the amount of electrical power capable of charging the battery is limited. Accordingly, when the SOC (State of Charge) of the battery reaches a permissible upper limit value, the electrical power generated by the power of the engine cannot be used for charging the battery. Thus, the engine needs to drive in the idle state only for ensuring the heating performance, and thus the efficiency of the engine would be worse.

The object of the present invention is to ensure the heating performance and improve the efficiency of the engine, in a hybrid vehicle in which intermittent stop control of the engine is performed.

A hybrid vehicle according to an aspect of the present invention includes an internal combustion engine, a first heater that heats a vehicle compartment by using cooling water of the internal combustion engine, an electrical storage device, a second heater that heats the vehicle compartment by using electrical power supplied by the electrical storage device, and a controller. In driving of the internal combustion engine, when a prescribed condition including that the temperature of the cooling water is equal to or higher than a reference temperature is satisfied, the controller controls the internal combustion engine to stop. In a case where the second heater is operated while the internal combustion engine is driving, the controller controls the second heater, such that when the state quantity indicating a state of charge of the electrical storage device is equal or higher than a threshold, an amount of heat generation of the second heater becomes higher than that generated when the state quantity is less than the threshold, and sets the reference temperature to be low as compared to when the state quantity is less than the threshold.

The heating performance of the whole vehicle is determined by the amount of heat from the cooling water of the internal combustion engine and the amount of heat generation of the second heater. According to the above-mentioned structure, when the state quantity of the electrical storage device is equal or higher than the threshold, even if the amount of heat from the cooling water is reduced by increased quantity of the amount of heat generation of the second heater, the desired heating performance may also be ensured. Accordingly, since the reference temperature of the cooling water may be set to be low, the above prescribed condition for stopping the internal combustion engine becomes easily to be satisfied. The efficiency of the engine may be improved by stopping the internal combustion engine.

When the temperature of the cooling water is lower than the reference temperature, the controller may also control the internal combustion engine to generate the power such that the power generated when the temperature of the cooling water is less than the reference temperature is higher than that generated when the internal combustion engine is in an idle state. The hybrid vehicle may further include a rotary electric machine that generates electrical power by using the power of the internal combustion engine. The electrical storage device may also be configured to be able to be charged by the electrical power generated by the rotary electric machine.

According to the above configuration, in a case where the temperature of the cooling water is less than the reference temperature, not only the amount of heat of the internal combustion engine is used for raising the temperature of the cooling water, but also the power of the internal combustion engine is used for electrical power generation of the rotary electric machine. By using the electrical power generated by the rotary electric machine to charge the electrical storage device, the electrical power may be applied to running or heating of the second heater and the like later. The internal combustion engine drives in a state with higher efficiency compared with the idle state, so the fuel economy may be improved.

In a case where there is no request for heating the vehicle compartment, the controller may set the reference temperature such that the reference temperature set when there is no request for heating the vehicle compartment is lower than that set when there is the request for heating.

In a case where there is no request for heating, the necessity of keeping the temperature of the cooling water relatively high is small. According to the above configuration, in a case where the necessity of keeping the temperature of the cooling water relatively high is small, the internal combustion engine may be stopped within a wider temperature range by setting the reference temperature to be low. Thus, the efficiency of the engine can be improved.

According to the present invention, in the hybrid vehicle in which intermittent stop control of the engine is preformed, the efficiency of the engine may be improved, while the heating performance is ensured.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The embodiments of the present invention will be described in detail below with reference to the accompanying drawings. In addition, for the same or equivalent parts in the accompanying drawings, the same reference numbers are given, and repeated description is omitted.

Figure 1:
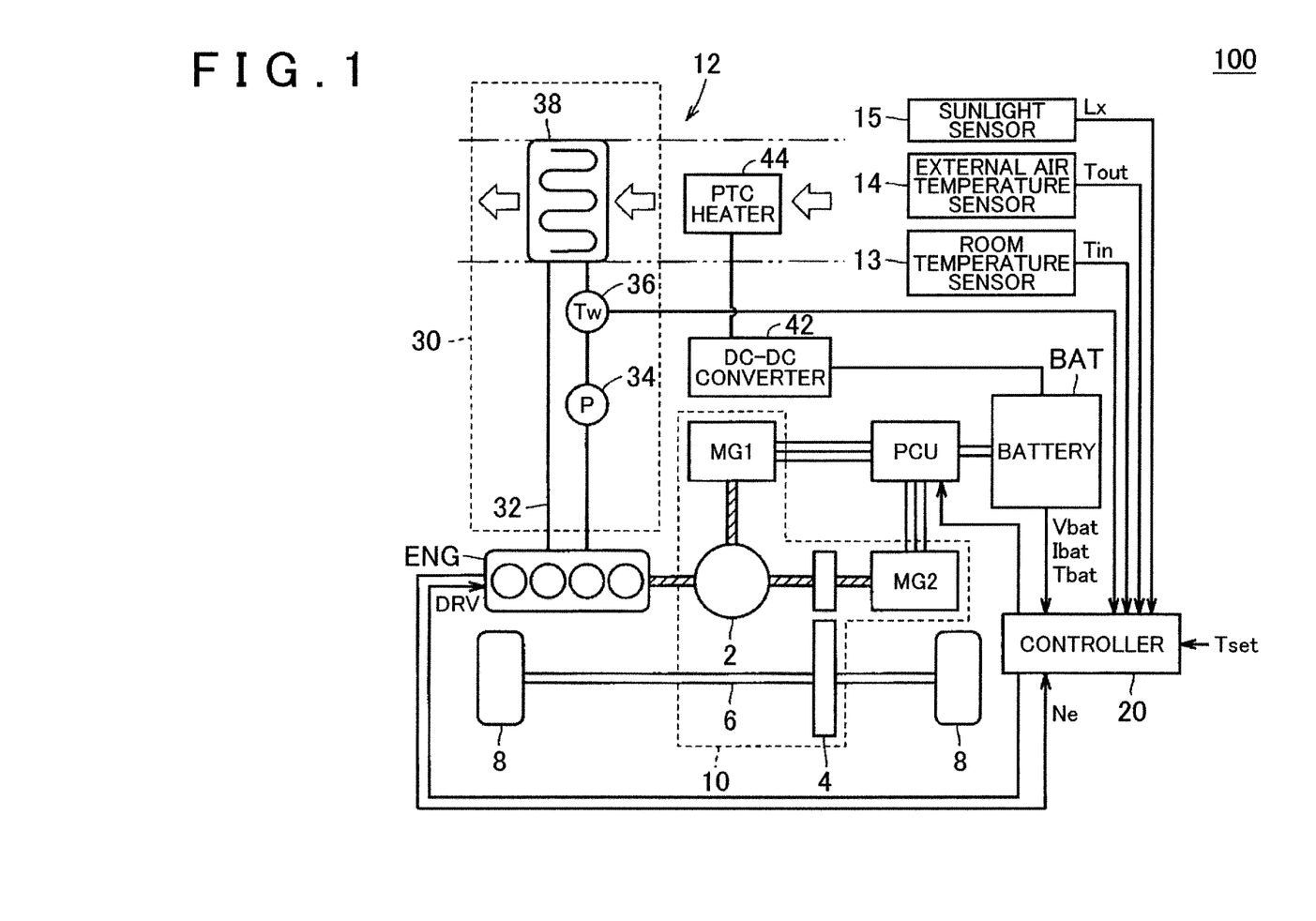
FIG. 1 is a schematic structural drawing of a hybrid vehicle according to an embodiment of the present invention.

FIG. 1 is a schematic structural drawing of a hybrid vehicle 100 according to an embodiment of the present invention. With reference to FIG. 1, the hybrid vehicle 100 includes an engine ENG, a battery BAT, a power control unit PCU, wheels 8, a transaxle 10, a controller 20 and an air-conditioner 12.

The engine ENG produces a driving force for the wheels 8 by burning fuel such as gasoline. In addition, the engine ENG operates according to a driving instruction DRV from the controller 20, and sends a signal indicating an engine revolution speed Ne detected by a rotating sensor (not shown in the figures) to the controller 20.

The battery BAT supplies DC power to the power control unit PCU. The battery BAT is typically composed of a rechargeable secondary battery such as a nickel-metal hydride battery or a lithium ion battery.

A battery sensor (not shown in the figures) is arranged on the battery BAT. The battery sensor measures voltage Vbat of the battery BAT, current that input to or output from the battery BAT and temperature Tbat of the battery BAT, and sends the measurement results to the controller 20. The controller 20 calculates the SOC (State of Charge) of the battery BAT based on the measurement results of the battery sensor. In the calculation, since well-known methods may be utilized, detailed description is omitted herein.

The power control unit PCU converts the DC power supplied from the battery BAT into AC power, and outputs to the transaxle 10. In addition, the power control unit PCU converts the AC power supplied from the transaxle 10 into DC power, and outputs to the battery BAT.

The transaxle 10 is provided with a transmission and an axle as a integral construction. The transaxle 10 includes a power split mechanism 2, a speed reducer 4 and motor generators MG1 and MG2.

The power split mechanism 2 may divide the driving force output by the engine ENG into a path transmitting the driving force to the axle 6 for driving the wheels via the speed reducer 4 and a path transmitting the driving force to the motor generator MG1.

The motor generator MG1 (rotary electric machine) is rotated by the driving force from the engine ENG transmitted via the power split mechanism 2 to generate electrical power. The electrical power generated by the motor generator MG1 is supplied to the power control unit PCU, and is used as electrical power for charging the battery BAT or driving electrical power of the motor generator MG2. In this way, the battery BAT is configured to be able to be charged by the electrical power generated by the motor generator MG1.

The motor generator MG2 is rotated by the AC power supplied from the power control unit PCU. The driving force generated by the motor generator MG2 is transmitted to the axle 6 via the speed reducer 4. In addition, during regenerative braking, the motor generator MG2 is rotated along with deceleration of the wheels 8. The electromotive force (AC power) generated by the motor generator MG2 is supplied to the power control unit PCU.

In order that the hybrid vehicle 100 runs according to the instruction of a driver, the controller 20 controls all actions of devices and circuits mounted in the vehicle. The controller 20 is typically composed of a microcomputer and the like for executing prescribed sequence preprogrammed and prescribed calculation.

The air-conditioning device 12 includes a heating mechanism 30, a DC-DC converter 42, and a PTC (Positive Temperature Coefficient) heater 44. The heating mechanism 30 (first heater) has a cooling water pipe 32, a circulating pump 34, a water temperature sensor 36 and a heater core 38.

The circulating pump 34 performs pumping operation, so that cooling water of the engine ENG (also called as engine cooling water below) is circulated in a path including the heater core 38 via the cooling water pipe 32. The engine cooling water exchanges heat when passing through the heater core 38, and air to be blown to the vehicle compartment is heated. The water temperature sensor 36 is arranged in the circulating path for the engine cooling water. The water temperature sensor 36 measures the temperature Tw of the engine cooling water (also called as cooling water temperature below) and sends the measurement result to the controller 20.

The DC-DC converter 42 increases or reduces the voltage of the battery BAT to a voltage capable of being used by the PTC heater 44. The PTC heater 44 generates heat by the electrical power supplied from the battery BAT to heat the air to be blown to the vehicle compartment. In addition, the PTC heater 44 is equivalent to an "electric heater", regarded as a second heater. However, the "electric heater" may be any heater that is able to generate heat by the electrical power of the battery BAT, and the type of the electric heater is not specifically limited.

In this way, the hybrid vehicle 100 has two energy sources for heating the air to be blown to the vehicle compartment. The heating mechanism 30 heats the vehicle compartment by using the heat energy of the engine cooling water. On the other hand, the PTC heater 44 heats the vehicle compartment by using the electric energy of the battery BAT.

When only the heating mechanism 30 is used, as mentioned above, the situation in which the engine ENG needs to be driven in an idle state occurs easily, so the efficiency becomes worse. On the other hand, when only the PTC heater 44 is used, the waste heat of the engine ENG is not able to be utilized. Therefore, in this embodiment, the engine ENG and the PTC heater 44 are coordinately controlled. Such a control will be described in detail later.

In addition, in FIG. 1, arrows indicate air flow in the air-conditioner 12. In FIG. 1, the PTC heater 44 is arranged at the upstream side of the air flow, and the heater core 38 is arranged at the downstream side, but the arrangement of these heaters may be appropriately changed.

The hybrid vehicle 100 is further provided with a room temperature sensor 13, an external air temperature sensor 14 and a sunlight sensor 15, as a configuration for controlling heating in the vehicle compartment.

The room temperature sensor 13 is arranged in the vehicle compartment of the hybrid vehicle 100. The room temperature sensor 13 measures the temperature Tin in the vehicle compartment and sends the measurement result to the controller 20. The external air temperature sensor 14, for example, is arranged in a front portion of the hybrid vehicle 100. The external air temperature sensor 14 measures the temperature Tout of external air and sends the measurement result to the controller 20. The sunlight sensor 15 is arranged at a location capable of receiving sunlight, such as directly below a front window of the hybrid vehicle 100. The sunlight sensor 15 measures the illuminance Lx of the sunlight and sends the measurement result to the controller 20.

In addition, the controller 20 receives a heating request (a request for heating the vehicle compartment of the hybrid vehicle 100). The heating request may also include a signal indicating the set temperature Tset in the vehicle compartment. The heating request is given by the operation of a driver, for example.

The controller 20 determines a blowing rate of air and a blowing temperature corresponding to the heating request based on the cooling water temperature Tw, the temperature Tin in the vehicle compartment, the temperature Tout of the external air and the illuminance Lx. As an example, the controller 20 determines the optimal blowing rate of air and blowing temperature based on a map using the temperature difference between the set temperature Tset and the temperature Tin in the vehicle compartment, the temperature Tout of the external air and the illuminance Lx as parameters.

In the hybrid vehicle 100 configured as above, even in a case where the aim is to raise the cooling water temperature Tw, the engine ENG is driven, so as to produce higher power compared with the idle state. This is due to the following reason: when the engine ENG is driven in the idle state, the power of the engine ENG is only used for raise the cooling water temperature Tw, so the waste of the fuel is high. In a case where higher power is generated compared with the idle state, the motor generator MG1 may generate electrical power by using the power generated by the engine ENG The electrical power generated by the motor generator MG1 is charged to the battery BAT.

Specifically, the controller 20 controls the engine ENG and the power control unit PCU based on the charge and discharge request amount Pchg of the battery BAT. For example, when the charge and discharge request amount Pchg (charge request amount) is increased by the controller 20, the power generated by the engine ENG is increased and the electrical power generation amount of the motor generator MG1 is increased. That is, the power of the engine ENG may be adjusted according to the charge and discharge request amount Pchg. In this way, in this specification, the condition that the charge and discharge request amount Pchg is increased in order to raise the cooling water temperature Tw so that the engine ENG generates power higher than that generated when the engine is in the idle state, is also called as "upgrade of the charge and discharge request amount Pchg".

Further, in this embodiment, to reduce the consumption of the fuel, the engine ENG is controlled to intermittently stop (also called as intermittent stop control below). In the intermittent stop control, when the cooling water temperature Tw does not rise to a temperature for ensuring the desired heating performance, stop of the engine ENG is prohibited. When the cooling water temperature Tw reaches the temperature, the stop of the engine ENG is permitted. In other words, in driving of the engine ENG, when a prescribed condition or prescribed conditions including that the cooling water temperature Tw becomes equal to or higher than the temperature permitting the engine ENG to stop (also called as permissible water temperature below) are satisfied, the controller 20 controls the engine ENG to stop.

The permissible water temperature may be determined on the basis of whether the heating request exists or not and the SOC (State of Charge) of the battery. In addition, the permissible water temperature is regarded as a "reference temperature".

Figure 2:
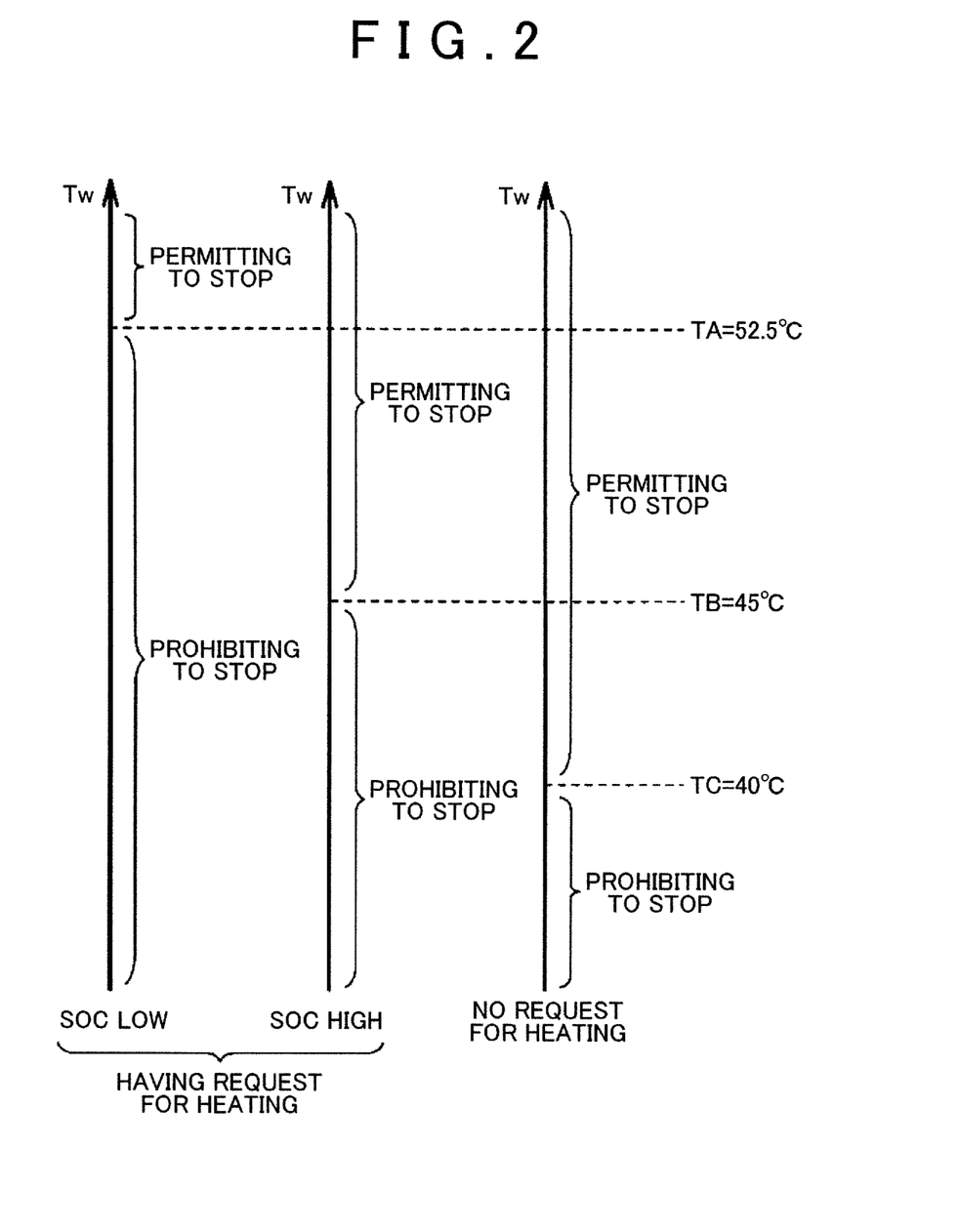
FIG. 2 is a conceptual diagram for explaining intermittent stop control according to the temperature of cooling water.

FIG. 2 is a conceptual diagram for explaining the intermittent stop control of the engine ENG according to the cooling water temperature Tw. With reference to FIG. 2, the arrow on the left of FIG. 2 indicates the intermittent stop control in a case where there is a request for heating and the SOC is less than a prescribed threshold TH. The arrow in the middle of FIG. 2 indicates the intermittent stop control in a case where there is the request for heating and the SOC is equal to or higher than the threshold TH. The arrow on the right of FIG. 2 indicates the intermittent stop control in a case where there is no request for heating.

The permissible water temperatures TA, TB and TC are in order of high to low (TA>TB>TC). As an example, the permissible water temperatures TA, TB and TC are respectively 52.5° C., 45° C. and 40° C.

As shown on the left of FIG. 2, in a case where there is the request for heating and the SOC is less than the threshold TH, the controller 20 sets the permissible water temperature TA. That is, the controller 20 permits the engine to stop when the cooling water temperature Tw is equal to or higher than the permissible water temperature TA, and on the other hand, prohibits the engine to stop when the cooling water temperature Tw is less than the permissible water temperature TA.

Next, as shown in the middle of FIG. 2, in a case where there is the request for heating and the SOC is equal to or higher than the threshold TH, the controller 20 sets the permissible water temperature TB. That is, the controller 20 permits the engine to stop when the cooling water temperature Tw is equal to or higher than the permissible water temperature TB, and on the other hand, prohibits the engine to stop when the cooling water temperature Tw is less than the permissible water temperature TB.

Further, as shown on the right of FIG. 2, in a case where there is no request for heating, the controller 20 sets the permissible water temperature TC. That is, the controller 20 permits the engine to stop when the cooling water temperature Tw is equal to or higher than the permissible water temperature TC, and on the other hand, prohibits the engine to stop when the cooling water temperature Tw is less than the permissible water temperature TC.

In addition, the cooling water temperature Tw being equal to or higher than the permissible water temperature, or being less than the permissible water temperature, is just only one of conditions for determining driving and stop of the engine ENG. Other conditions for determining driving and stop of the engine ENG may be appropriately determined. Herein, this embodiment is not limited to be applied when parking the hybrid vehicle 100, but also be able to be applied when the vehicle runs. Accordingly, the conditions relating to the cooling water temperature Tw, may be combined with e.g. the condition relating to the driving force required for running of the vehicle (opening degree of an accelerator or vehicle speed and the like). As an example, even if the cooling water temperature Tw is equal to or higher than the permissible water temperature, the engine ENG may be driven when accelerating.

Figure 3:
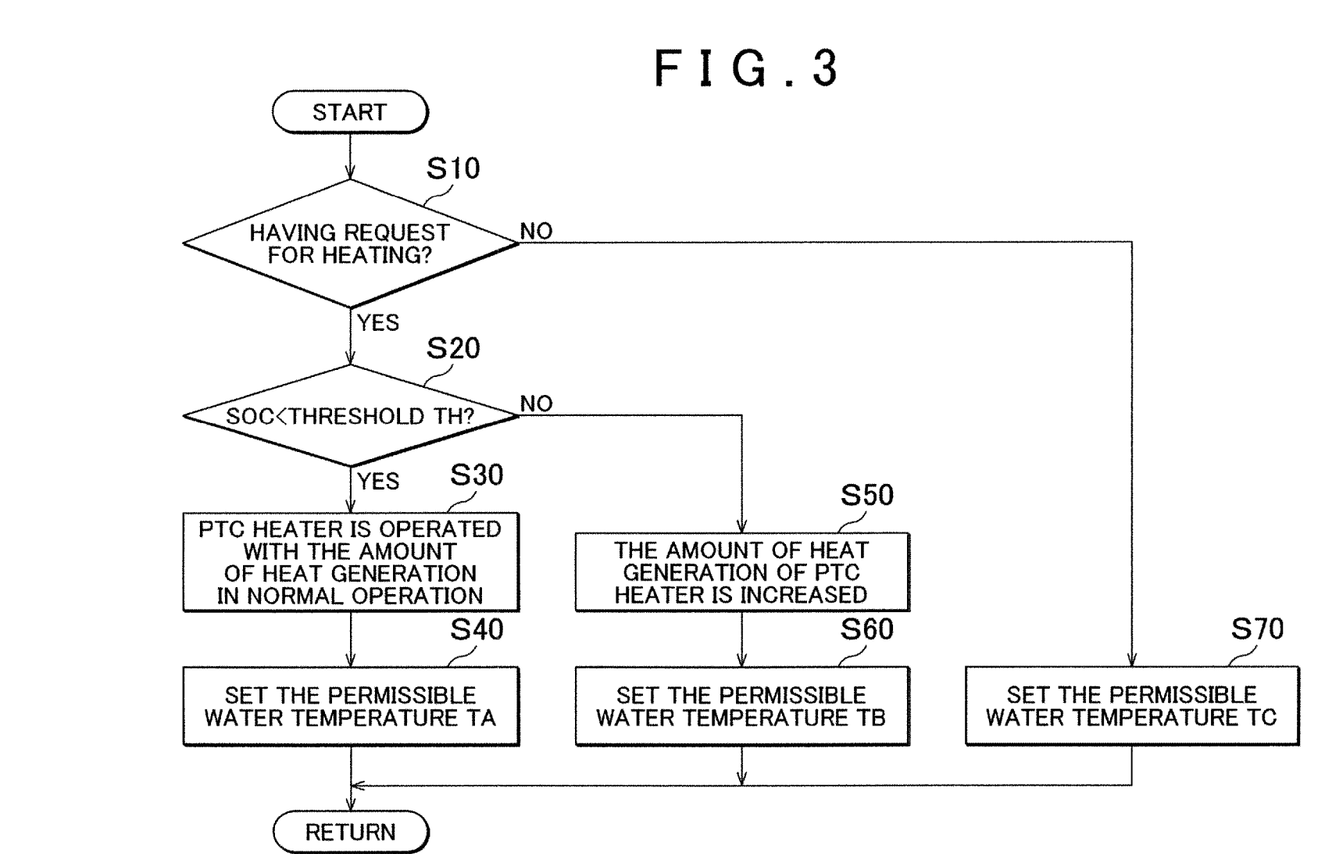
FIG. 3 is a flow chart showing control of a PTC heater and determination of permissible water temperatures.

FIG. 3 is a flow chart for explaining control of the PTC heater 44 and setting of the permissible water temperatures TA, TB and TC. With reference to FIG. 3, the processing shown in the flow chart, for example, is implemented in each prescribed period or when the prescribed condition is satisfied every time.

In step S10, the controller 20 determines whether there is the request for heating. As mentioned above, the heating request, for example, is given by the operation of the driver. In a case where there is the request for heating (the determination result is YES in step S10), the processing enters step S20.

In step S20, the controller 20 determines whether the SOC of the battery BAT is less than the threshold TH (e.g. 50%). In a case where the SOC is less than the threshold TH (the determination result is YES in step S20), the processing enters step S30. On the other hand, in a case where the SOC is equal to or higher than the threshold TH (the determination result is NO in step S20), the processing enters step S50.

In step S30, the controller 20 controls the PTC heater 44 to operate with an amount of heat generation during normal heating. Further, in step S40, the controller 20 sets the permissible water temperature TA.

In contrast, in step S50, the controller 20 controls the PTC heater 44, so that the amount of heat generation of the PTC heater 44 becomes greater than that in step S30. Further, in step S60, the controller 20 sets a permissible water temperature TB lower than the permissible water temperature TA.

In a case where there is no request for heating in step S10 (the determination result is NO in step S10), the processing enters step S70. In step S70, the controller 20 sets a permissible water temperature TC. The permissible water temperature 70 is lowest among the permissible water temperatures TA, TB and TC. In other words, in a case where there is no heating request requiring to heat the vehicle compartment, the controller 20 sets the permissible water temperature such that the permissible water temperature set when there is no request for heating the vehicle compartment is lower than that set when there is the request for heating. This is because of the necessity of keeping high cooling water temperature Tw being small, in a case where there is no request for heating. In addition, the PTC heater 44 may be stopped.

When processing in any one of steps S40, S60 or S70 is ended, the processing returns to the main routine. After this, during each prescribed period or when the prescribed condition is satisfied every time, a series of processing shown in FIG. 3 is repeated. In addition, the sequence of the processing in steps S30 and S40 may be exchanged, and the sequence of the processing in the steps S50 and S60 may also be exchanged.

The reason for changing the amount of heat generation of the PTC heater 44 and the permissible water temperature according to the SOC of the battery BAT will be described below. In spite of the SOC being less than the threshold TH, if the amount of heat generation of the PTC heater 44 is increased in step S30 in the same way as in step S50, the SOC will easily reach a permissible lower limit value. When the SOC is less than the permissible lower limit value, for charging the battery BAT, the engine ENG is forcibly driven. Thus, the consumption of the fuel is increased. Therefore, in a case where the SOC is less than the threshold TH, the increasing of the amount of heat generation of the PTC heater 44 is inhibited.

In addition, as described above, the air for heating the vehicle compartment is heated by both the PTC heater 44 and the engine cooling water. In a case where the SOC is less than the threshold TH, because the PTC heater 44 is controlled so that the amount of heat generation is inhibited, the amount of heat generation of the PTC heater 44 is relatively small. Thus, to ensure the desired heating performance, the cooling water temperature Tw is necessarily to be relatively high. Hence, in step S40, the permissible water temperature TA higher than the permissible water temperature TB is set. In this way, in a case where the SOC is less than the threshold TH, the controller 20 preferentially keeps the SOC to avoid forcible charging of the battery BAT as far as possible.

In contrast, in a case where the SOC is equal to or higher than the threshold TH, as shown in step S50, the controller 20 increases the amount of heat generation of the PTC heater 44. By this way, even if the cooling water temperature Tw is relatively lower and the contribution of the PTC heater 44 in heating of the compartment is increased, the desired heating performance may also be ensured. Therefore, in step S60, the permissible water temperature TB lower than the permissible water temperature TA may be set.

If it is explained from the opposite standpoint, the heating performance of the heating mechanism 30 is decreased by setting the permissible water temperature TB lower than the permissible water temperature TA. However, the decrease of the heating performance of the heating mechanism 30 may be compensated by increase of the amount of heat generation by the PTC heater 44.

In this way, the PTC heater 44 can be positively utilized in step S50, that is, the electric energy stored in the battery BAT can be positively utilized, to heat the vehicle compartment. As a result, since the permissible water temperature may be set to be lower in step S60 compared with step S40, the engine ENG may be stopped within a wide temperature range of the cooling water temperature Tw. Thus, the efficiency of the engine may be improved.

In addition, in step S50, since the electrical power consumed by the PTC heater 44 is increased, the reduced amount of the SOC is increased. Thus, even if the upgrade of the charge and discharge request amount Pchg has been performed, the SOC is difficult to reach the permissible upper limit value. Accordingly, since the frequency of performing the upgrade of the charge and discharge request amount Pchg may be increased, the condition that the engine needs to be driven in the idle state is not likely to occur. Therefore, the fuel economy may be improved.

In addition, although it has been described that the threshold TH of the SOC is 50% for example, preferably, the threshold TH is set to be as low as possible within a range in which the battery BAT is not forcibly charged. This is because the lower the threshold TH is, the more the opportunity for increasing the amount of heat generation of the PTC heater 44 becomes (in the determination of step S20, the processing is more likely to enter step S50).

Figure 4:
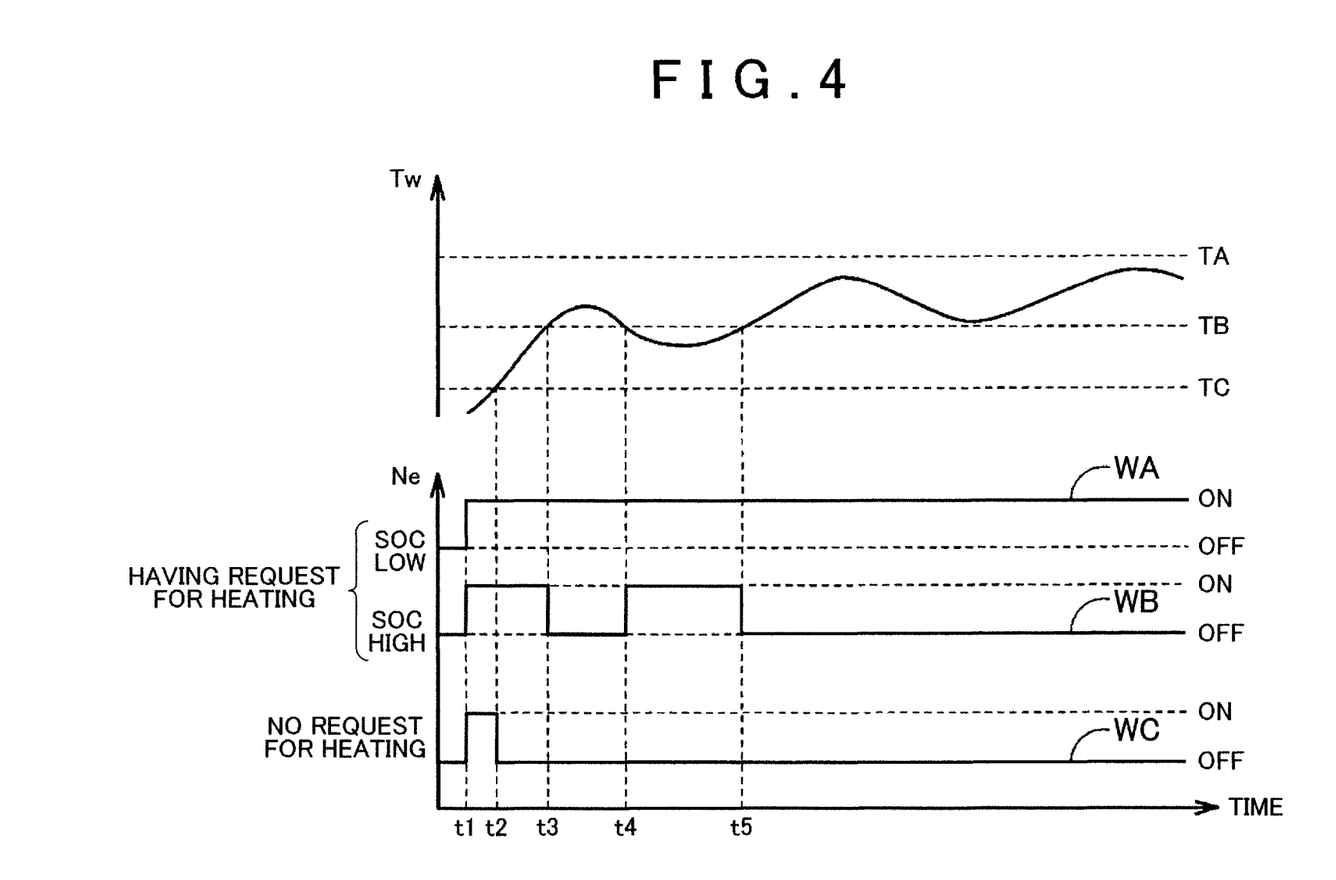
FIG. 4 is a timing chart showing an example of the action of an engine according to the temperature of the cooling water.

FIG. 4 is a timing chart showing an example of the operation of the engine ENG according to the cooling water temperature Tw. With reference to FIG. 4, the horizontal axis is a time axis. The graph on the upper side of FIG. 4 shows the cooling water temperature Tw, and the graph on the lower side of FIG. 4 shows the engine revolution speed Ne.

In the graph on the lower side of FIG. 4, the waveform WA shows the engine revolution speed Ne in a case where there is the request for heating and the SOC is less than the threshold TH. The waveform WB shows the engine revolution speed Ne in a case where there is the request for heating and the SOC is equal to or higher than the threshold TH. The waveform WC shows the engine revolution speed Ne in a case where there is no request for heating.

In a period before time t1, the cooling water temperature Tw is lower than the permissible water temperature TC. At the time t1, an engine warming up request (a request for raising the temperature of the engine ENG) is output, and the engine ENG is driven. In addition, the engine warming up, for example, is performed on the purpose of stabilization of the combustion state of the engine ENG, activation of a catalyst for purifying exhaust gas, or ensuring of startability when heavy fuel (e.g. summer fuel) is used.

At time t2, the cooling water temperature Tw exceeds the permissible water temperature TC. In a case where there is no request for heating (refer to the waveform WC), the engine ENG is stopped (refer to step S70 of FIG. 3). In an example shown in FIG. 4, after the time t2, since the cooling water temperature Tw does not become a temperature less than the permissible water temperature TC, the stop state of the engine ENG is kept in the waveform WC.

In a case where there is the request for heating and the SOC is less than the threshold TH (refer to the waveform WA), after the time t1, the driving state of the engine ENG is kept (refer to step S40 of FIG. 3). This is because, in the example shown in FIG. 4, the cooling water temperature Tw does not exceed the permissible water temperature TA.

On the other hand, in a case where there is the request for heating and the SOC is equal to or higher than the threshold TH (refer to the waveform WB), at time t3, since the cooling water temperature Tw exceeds the permissible water temperature TB, the engine ENG is stopped (refer to step S60 of FIG. 3). After this, at time t4, since the cooling water temperature Tw is less than the permissible water temperature TB, the engine ENG is driven. Further, at time t5, since the cooling water temperature Tw exceeds the permissible water temperature TC again, the engine ENG is stopped again.

It could be seen that, in the example shown in FIG. 4, when the waveform WA (the case of the permissible water temperature TA) is compared with the waveform WB (the case of the permissible water temperature TB lower than the permissible water temperature TA), in the waveform A, the engine ENG is driven at all times after the time t1, whereas in the waveform WB, the engine ENG is intermittently stopped. In this way, the efficiency of the engine may be improved by setting the permissible water temperature to be low.

Finally, with reference to FIG. 1 again, this embodiment is summarized. The hybrid vehicle 100 is provided with the engine ENG, the heating mechanism 30 that heats the vehicle compartment by using the cooling water of the engine ENG, the battery BAT, the PTC heater 44 that heats the vehicle compartment by using the electrical power supplied from the battery BAT, and the controller 20. In driving of the engine ENG, when the prescribed condition including that the cooling water temperature Tw of the engine ENG is equal to or higher than the permissible water temperature or above are satisfied, the controller 20 controls the engine ENG to stop. In driving of the engine ENG, in a case where the PTC heater 44 is operated, the controller 20 controls the PTC heater 44, so that when the SOC of the battery BAT is equal to or higher than the threshold TH, the amount of heat generation of the PTC heater 44 is higher than that generated when the SOC is less than the threshold TH, and sets the permissible water temperature to be low.

Preferably, in a case where the cooling water temperature Tw is less than the permissible water temperature, the controller 20 controls the engine ENG so as to produce power higher than that produced when the engine ENG is in the idle state. The hybrid vehicle 100 is further provided with the motor generator MG1 that generates electrical power by using the power of the engine ENG The battery BAT is configured to be able to be charged by the electrical power generated by the motor generator MG1.

Preferably, in a case where there is no request for supplying heat to the compartment, the controller 20 sets the permissible water temperature to be lower than that set in the case the there is the request for heating.

The embodiment disclosed herein is completely an example, and should not be regarded to limit the present invention. The scope of the present invention is determined by the scope of claims rather than the above descriptions, and intends to include all variations of meaning and scope equivalent to the scope of the claims.

What is claimed is:

1. A hybrid vehicle comprising:
   an internal combustion engine;
   a first heater configured to heat a vehicle compartment by using cooling water of the internal combustion engine;
   an electrical storage device;
   a second heater configured to heat the vehicle compartment by using electrical power supplied by the electrical storage device; and
   a controller configured to:
   (a) during driving of the internal combustion engine, in a case where a prescribed condition including that temperature of the cooling water is equal to or higher than a reference temperature is satisfied, control the internal combustion engine to stop,
   (b) in a case where the second heater is operated during driving of the internal combustion engine, when a state quantity indicating a state of charge of the electrical storage device is equal to or higher than a threshold, (i) control the second heater such that an amount of heat generation of the second heater is higher than an amount of heat generation of the second heater when the state quantity is less than the threshold; and (ii) set the reference temperature to be low as compared to the reference temperature when the state quantity is less than the threshold, (c) set the reference temperature such that the reference temperature set when there is no request for heating the vehicle compartment is lower than the reference temperature set when there is the request for heating.

2. The hybrid vehicle according to claim 1, further comprising:
a rotary electric machine configured to generate electrical power by using power of the internal combustion engine, wherein
the controller is configured to control the internal combustion engine to generate the power such that the power generated when the temperature of the cooling water is less than the reference temperature is higher than that generated when the internal combustion engine is in an idle state, and
the electrical storage device is configured to be charged by the electrical power generated by the rotary electric machine.

* * * * *